P. C. WEST.
SHOCKER.
APPLICATION FILED MAR. 23, 1918.
1,371,960.
Patented Mar. 15, 1921.
6 SHEETS—SHEET 1.
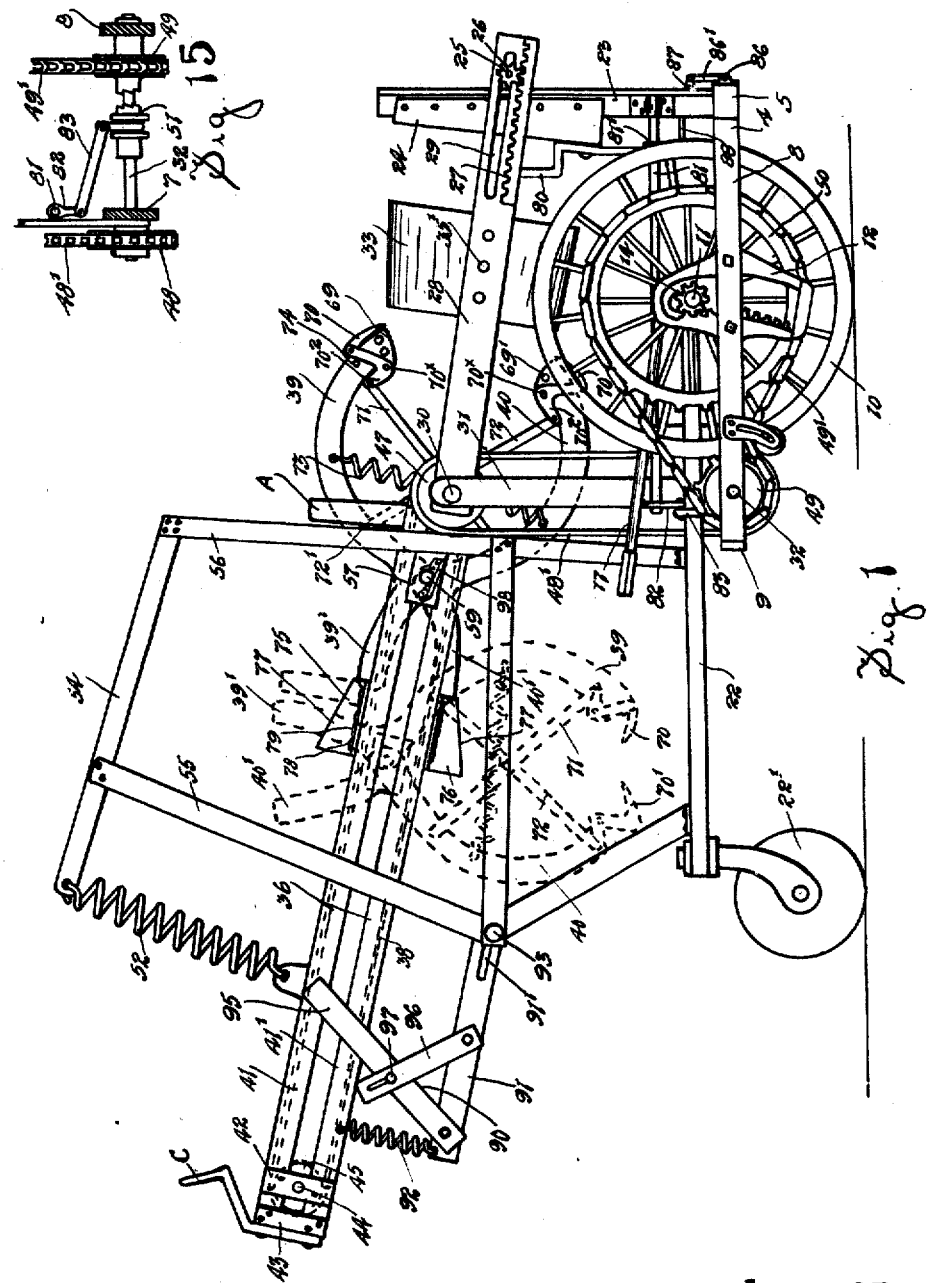
INVENTOR
P. C. West
BY Johnstnhaugh&Co.
ATTYS

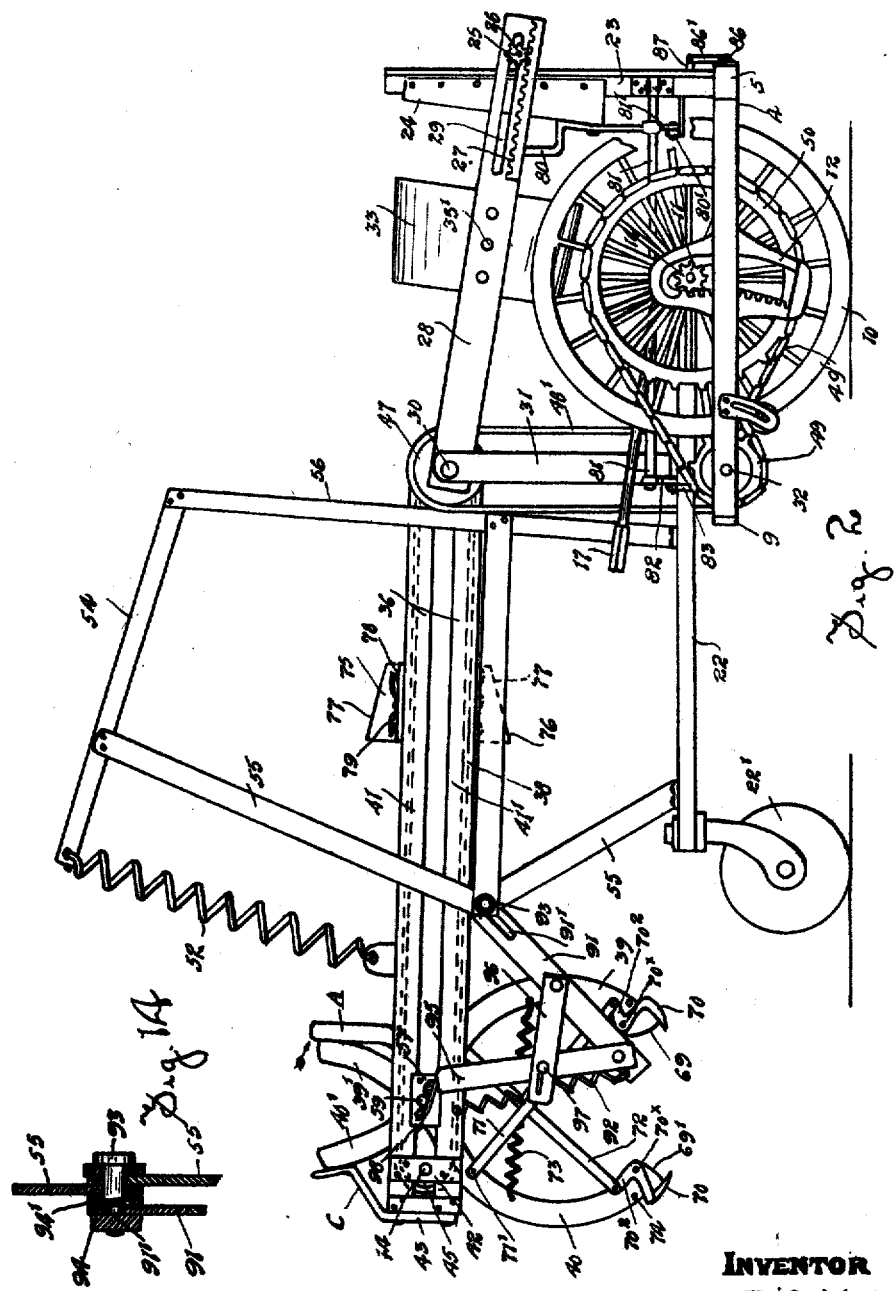

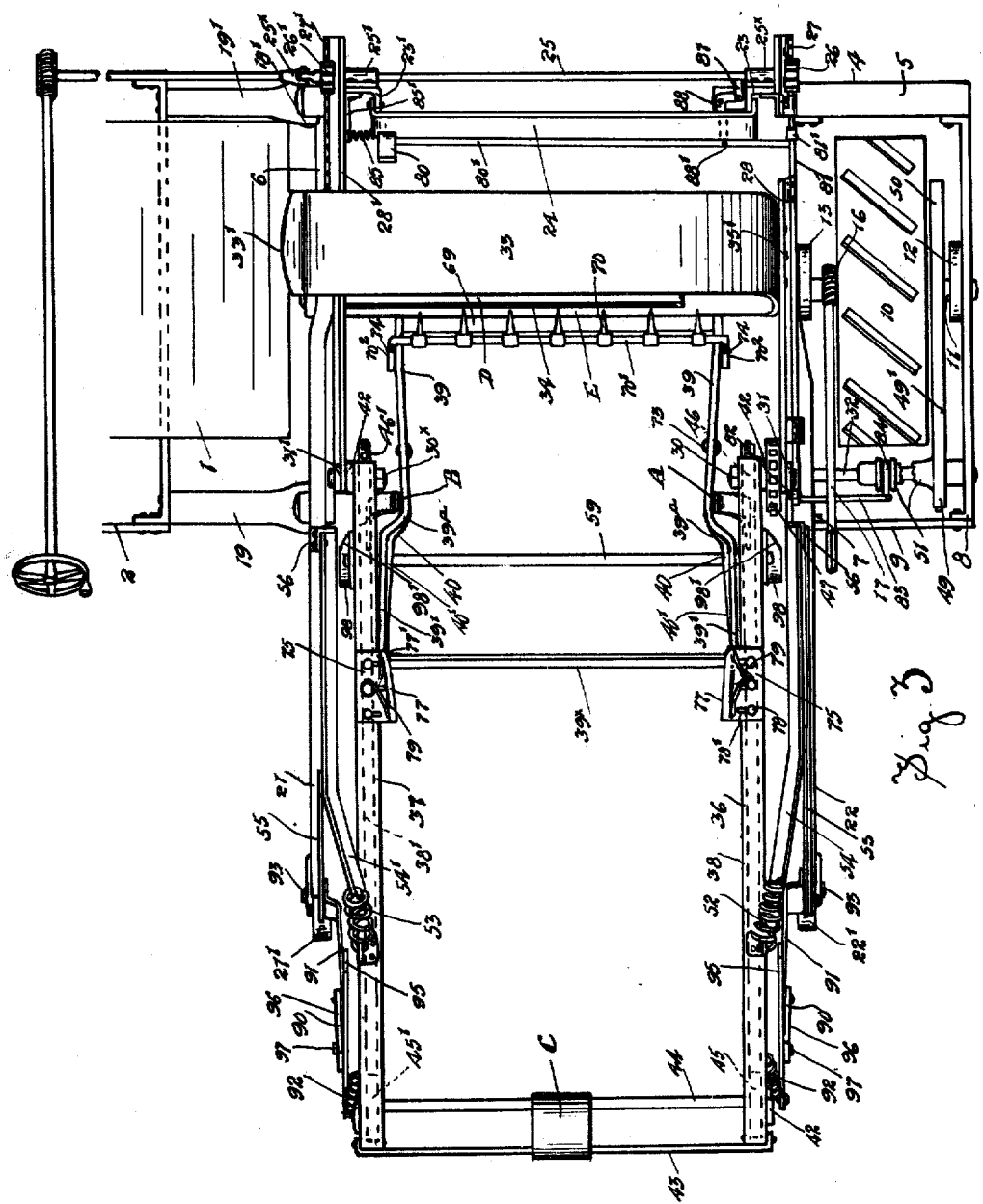

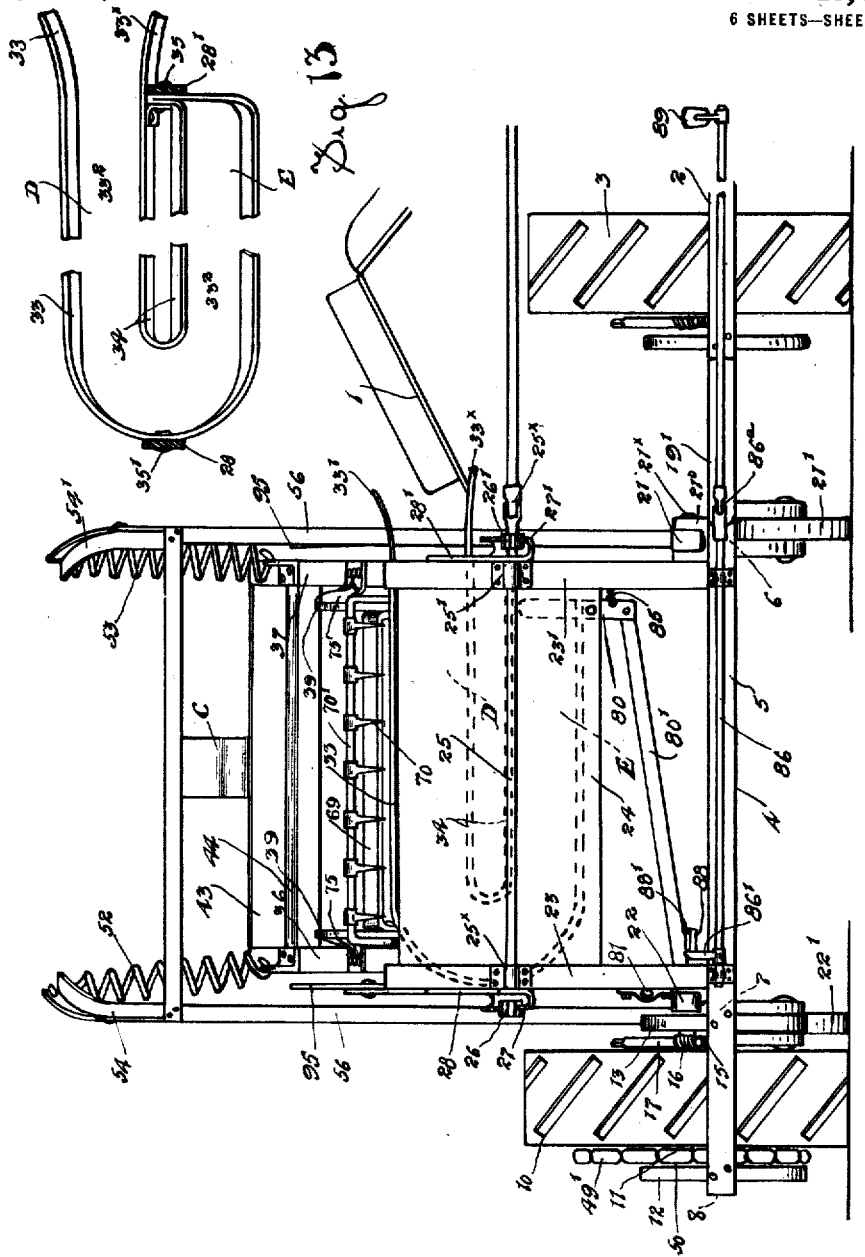

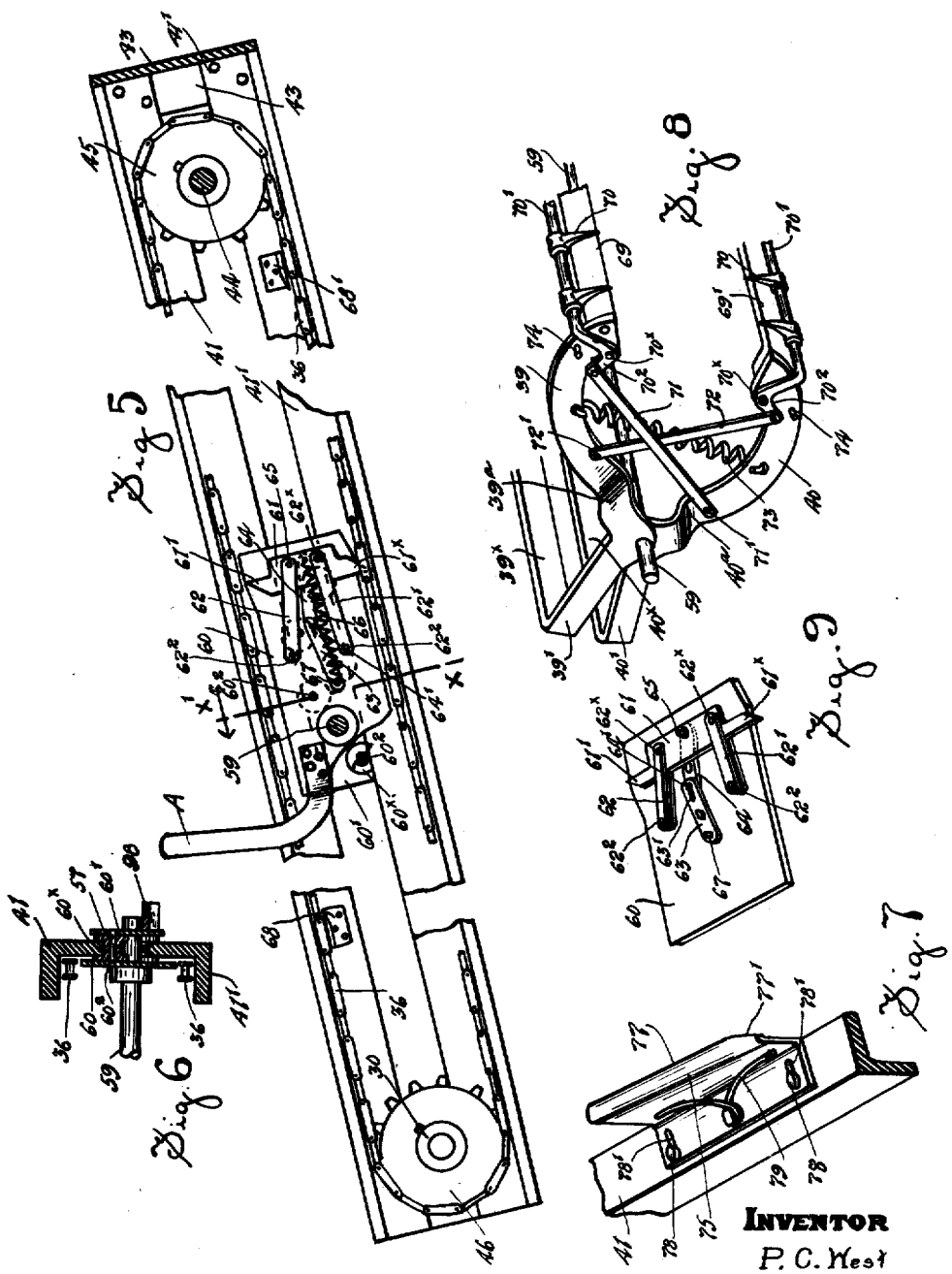

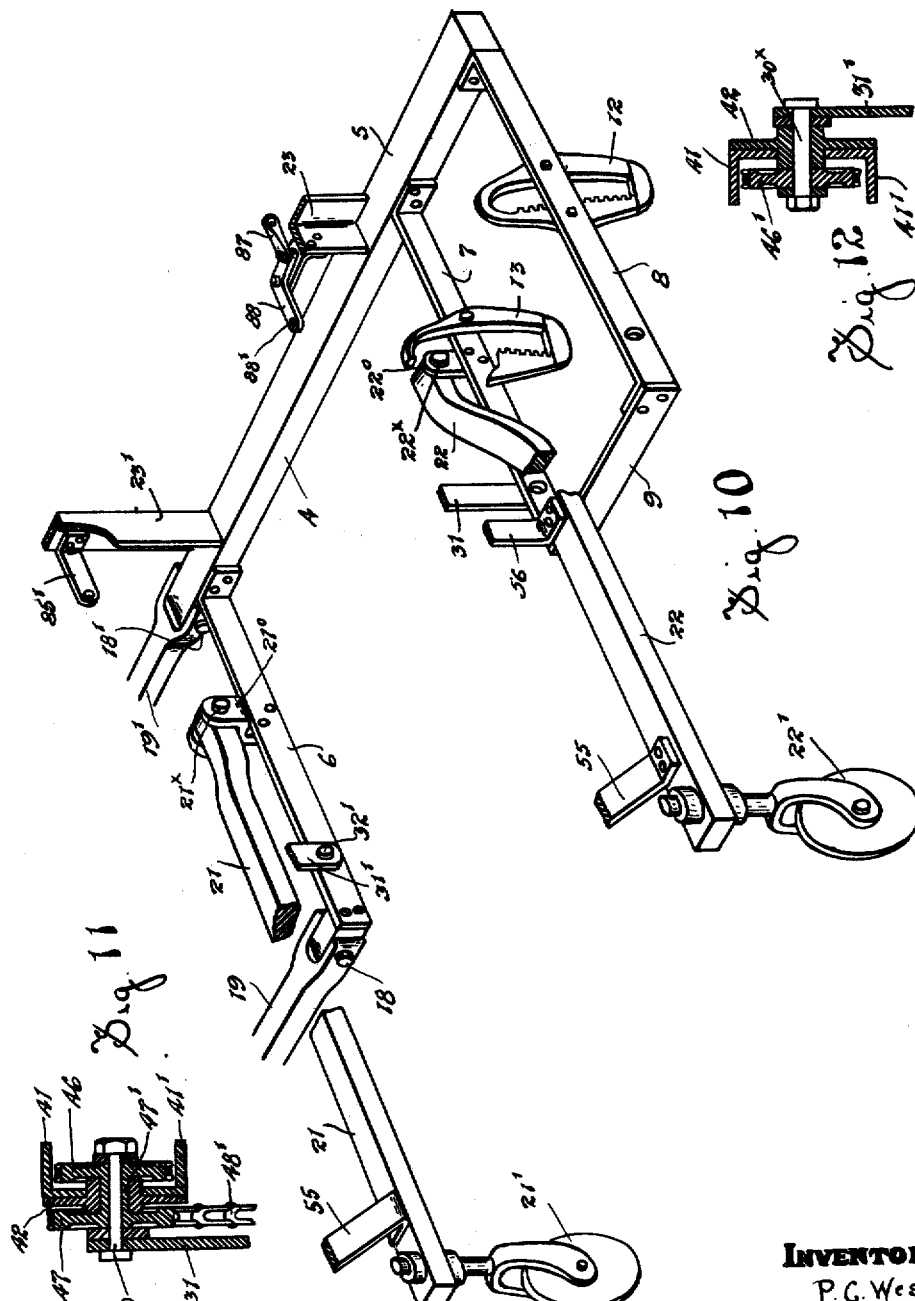

UNITED STATES PATENT OFFICE.

PRESTON CHARLES WEST, OF KINDERSLEY, SASKATCHEWAN, CANADA.

SHOCKER.

1,371,960.   Specification of Letters Patent.   Patented Mar. 15, 1921.

Application filed March 23, 1918. Serial No. 224,381.

*To all whom it may concern:*

Be it known that I, Preston Charles West, of the town of Kindersley, in the Province of Saskatchewan, Canada, have invented certain new and useful Improvements in Shockers, of which the following is the specification.

The invention relates to improvements in shockers and one of the objects of the invention is to provide a machine which will accompany the ordinary binding machine and will receive the sheaves ejected from the deck thereof, form them into a stook and deposit the formed stook firmly implanted on the ground.

A further object of the invention is to construct the shocker so that it can be readily leveled to accommodate the adjustments which may be required in the binder.

A further object of the invention is to construct a shocker having a receiver which receives the sheaves directly from the deck and forms them into a shock having the center of the shock spread to present a good base and the heads drawn together and to mount the receivers that it can be adjusted in respect to the deck to accommodate the varying lengths of sheaves which may be ejected over the deck.

A further object of the invention is to construct a shocker wherein the sheaves, in the form of a stook, are carried back in order to keep the stook relatively stationary in respect to the ground as the binder and stooker advance, such arrangement overcoming any tendency for the stook to fall over when being deposited or after depositing.

A still further object of the invention is to construct a machine wherein the stook is kept under control for a short interval of time after it has been deposited and to construct a machine so that as the stook is being brought to the ground it is, while still held, forcibly shoved down to firmly impinge the stook on the stubble and insure a good base.

A further object of the invention is to provide a machine arranged and constructed so that the attendant on the binder can control the time of depositing the stook, thereby allowing him to select the position where the stook is to be dropped.

A still further object of the invention is to provide a shocking machine with traveling gripping jaws for controlling the formed stook and to fit the jaws with automatically actuated teeth which pierce the stook and thereby allow of a lighter grip, so to speak, to be taken by the jaws while properly suspending the stook.

With the above general objects and other minor objects in view the invention consists essentially in the arrangement and construction of parts hereinafter more particularly described and later pointed out in the appended claims, reference being had to the accompanying drawings in which:—

Figure 1 represents a side view of the machine in the sheaf receiving position.

Fig. 2 represents a side view of the machine as it appears just prior to the time that the jaws leave the stook on the ground.

Fig. 3 represents a plan view of the machine as it appears in Fig. 1.

Fig. 4 represents a front end view of the machine.

Fig. 5 represents an enlarged detailed interior view of one of the runways.

Fig. 6 represents a sectional view through one of the runways, the section being taken in the plane denoted by the line X—X' and looking in the direction indicated by the applied arrow.

Fig. 7 represents a perspective view of one of the catches for engaging with the jaw arms.

Fig. 8 represents a perspective view of a part of the jaws.

Fig. 9 represents a perspective view of the inner plate of one of the sliding blocks showing the catch plate and adjacent parts.

Fig. 10 represents a perspective view of the frame of the shocker.

Fig. 11 represents an enlarged detailed sectional view through the endless chair driving gear and associated parts.

Fig. 12 represents an enlarged detailed sectional view through the driving gear at the other side of the carrier to the one shown in Fig. 11.

Fig. 13 represents a side view of the sheaf receiver.

Fig. 14 represents an enlarged detailed view of the adjustment for the stook setter.

Fig. 15 represents a side view of the counter shaft and adjacent parts.

In the drawings like characters of reference indicate corresponding parts in the several figures.

In describing my stooker I have only considered it necessary to show those parts of the binding machine with which my stooking machine is immediately associated, such parts comprising the deck 1 of the binder and the binder frame 2, the said frame being supported in the usual way at the deck side on the customary master or bull wheel 3.

My machine is located at the deck side of the binder, with the sheaf receiver thereof positioned so that the sheaves ejected in the ordinary way from the binder deck will be passed directly into the sheaf receiver. Further the shocker is pivotally connected to the binder frame in order to accommodate itself to any unevenness in the field with which the machine may have to contend.

Referring now to the drawings; 4 represents the main frame of the shocking machine which comprises a front cross beam 5, an inner side beam 6 and a pair of opposing parallel outer side beams 7 and 8 extending from the main beam and having their rear ends fastened together by a connecting beam 9. This construction provides a substantially rectangular outer framework for the main driving wheel 10 of the shocker, which driving wheel is a duplicate of the master wheel of the binder and is mounted on the cross shaft 11 which is adjustably carried in the side racks 12 and 13 presented by the frame members 7 and 8.

In connection with the shaft adjustment I may state that the shaft is provided with pinions 14 operatively mounted in the racks and is fitted further with a worm wheel 15 engageable with a worm 16 located at the inner end of a shaft 17.

I have not considered it necessary to give a detailed description of the rack and pinions nor the manner in which they are adjusted as this structure is the same as what is now used on a binder to adjust the frame in respect to the master wheel. The action is simply that one in turning the shaft 17 causes, through the worm and worm wheel, the frame to climb or run down the racks and gradually effects the raising or lowering of the outer side of the shocker frame in respect to the driving wheel which carries it. Obviously with such an arrangement I can level my shocker in respect to the ground, at any time, depending upon any leveling adjustment which may be made in the binding machine. The inner side of the shocker main frame, which it will be noticed is comparatively speaking short, is connected at the inner side pivotally as indicated at 18 and 18′ to the outer ends of a pair of fixed arms 19 and 19′ permanently secured to the deck side of the binder frame.

22 represents an outer trailing beam having the rear end thereof carried by a caster wheel 22′ and the forward end thereof swung from a pivot bolt 22ˣ carried by a bracket 22º permanently secured to the frame member 7. 21 represents a trailing beam similar to that 22 and located at the opposite side of the shocker frame and having the rear end thereof carried by a caster wheel 21′ and the forward end secured pivotally by means of a bolt 21ˣ to a bracket 21º secured to the inner beam 6 of the shocker frame and positioned directly opposing the former bracket.

These trailing beams carry a structure later described.

The main frame of the shocker carries an adjustable sheaf receiver which is located opposing the deck and is constructed in detail as now described, 23 and 23′ represent a pair of upstanding posts in the present instance formed from angle iron which posts have their lower ends permanently secured to the front beam 5 of the shocker frame and to the posts I secure permanently a vertically disposed but slightly inclining butting plate 24.

25 represents an adjusting shaft carried in suitable bearings 25′ and 25ˣ provided on the posts and 26 and 26′ represent a pair of pinions permanently secured to the adjusting shaft and operating on similar racks 27 and 27′ presented by adjustable side bars 28 and 28′, it being here noticed that the side bars are lengthwise slotted at 29 to allow the shaft 25 to pass through and permit of the bars having a sliding movement in respect to the shaft when the pinions are operated to shift the racks and consequently the bars. The rear ends of the side bars 28 and 28′ are connected pivotally by means of stub shafts 30 and 30ˣ to the upper ends of upstanding sway bars 31 and 31′ pivotally mounted on the rear end of the main frame 4, the bar 31 being swung from a counter shaft 32 mounted in the side bars 7 and 8 and the bar 31′ from a pivot bolt 32′ extending into the beam 6 in a location directly opposite the counter shaft. The shaft 25 is extending to the binder terminating in a location for convenient manipulation by the driver and is fitted with a swinging joint such as a universal joint 25ˣ to allow of the adjustment of the shocker. The side bars 28 and 28′ carry the sheaf receiver 33 which in reality is constructed from a spring plate of an elongated double U-shape and having one end open and flaring and the other end closed.

The detailed shape of the sheaf receiver is best shown in Fig. 13 of the drawings, where it will be seen that the two ends of the plate are oppositely flared as indicated at 33′ and 33ˣ and that the plate is so bent that a U-shaped passage 33² is formed to receive the sheaves, the two arms, D and E, so to speak, of the passage being separated by a divider 34. The receiver is permanently secured at the inner side to the inner side bar by bolts 35 and is permanently secured at the outer side to the outer side bar by bolts 35′. The end 33ˣ of the plate is designed to pass beneath the delivery end of the deck and the flared end 33′ thereof rides freely in a location above the deck, so that the sheaves ejected from the deck are naturally passed directly into the passage 33² of the receiver.

From the above description it will be obvious that the receiver is mounted so that it can be adjusted in respect to the deck to accommodate long or short sheaves as occasion may demand, the adjustment being effected by manipulating the shaft 25.

The stub shafts 30 and 30ˣ hereinbefore referred to form a drive for a carrier which is herein described in detail and which is also pivotally swung from the stub shafts.

The carrier embodies as the more important parts a pair of side guides or runways 36 and 37, endless chains 38 and 38′ and pairs of pivoted jaws 39 and 40, the jaws being mounted to operate backwardly and forwardly on the runways and to be driven in a particular way by the endless chains. The side guides are identical in construction and each comprises a pair of lengthwise extending spaced angle irons 41 and 41′ having their ends suitably fastened together by straps 42, the forward straps being pivotally mounted on the stub shafts as best shown in Figs. 11 and 12 of the drawings.

The rearmost ends of the side guides are connected by a cross bar 43. The outer ends of the runways carry a cross shaft 44 mounted in the outer straps 42 and to the said cross shaft I secure permanently a pair of chain wheels 45 and 45′ around which I pass the outer ends of the chains 38 and 38′, the inner ends of the chains being mounted on chain wheels 46 and 46′ located on the stub shafts 30 and 30ˣ. The chain wheel 46 is connected by means of a sleeve 47′ to a driving chain wheel 47 mounted also on the stub shaft 40 and driven by means of a driving chain 48′ from an under chain wheel 48 secured to the inner end of the counter shaft 32.

The counter shaft is supplied with a free chain wheel 49 connected by means of a driving chain 49′ with the main chain wheel 50 of the shocker which chain wheel is permanently secured in any suitable manner to the wheel 10. A normally disengaged clutch, indicated generally by the reference numeral 51, is supplied on the counter shaft to couple the free wheel 49 to the counter shaft when desired and in order to effect the driving of the counter shaft and the consequent operation of the chains 38 and 38′. The clutch is controlled in a particular manner later described.

The rear ends of the runways are suspended by means of a pair of relatively strong coiled springs 52 and 53 having their upper ends attached to elevated hanger bars 54 and 54′ rigidly suspended in each instance by side standards 55 and 56 mounted on the trailing beams 21 and 22. The runways carry similar opposing sliding blocks 57 and 58 which support pivotally the ends of a cross spindle 59 on which the jaws 39 and 40 herein before mentioned are mounted. The sliding blocks actually comprise inner and outer plates 60 and 60′ connected together by cross pins 60² on which I mount suitably located rollers 60ˣ, the rollers actually riding on the edges of the flanges of the angle irons forming the side guides. This arrangement is best shown in Fig. 6 of the drawings.

The inner plates of the blocks carry in each instance a special catch mechanism for alternately connecting the blocks with the upper and lower sides of the chains 38 and 38′ to effect the forward and back sliding movement of the blocks and consequently the jaws in the guides. The catch mechanism comprises (see Fig. 9) a comparatively short catch bar 61 fitted at the ends with oppositely arranged catches 61′ and 61ˣ and pivotally suspended by top and bottom sets of swinging links 62 and 62′ pivotally secured to the catch plate at 62ˣ and to the inner plate 60 of the sliding block at 62².

63 and 64 represent a pair of levers pivotally secured more or less centrally of their length to the plate 60 and having their inner ends connected together by a pivot pin 64′ carried by the lever 64 and operating within a slot 63′ located in the adjacent end of the lever 63. The outer end of the lever 64 is pivotally attached to the catch plate by means of a pin 65 and a coiled spring 66 extends between the pin 65 and a further pin 67 located at the free end of the lever 63. This spring is designed to buckle the joint formed between the levers 63 and 64 with the result that when the top catch 61′ is struck down the spring holds the latter joint buckled upwardly, as best shown in Fig. 5 of the drawings, and with the lower catch 61ˣ in its lowermost position. In this connection it will be obvious that when the catches of the catch plate are struck either up or down the links carrying the catch plate swing and this action results in the buckling of the joint between the levers either upwardly or downwardly as the case may be and the levers are held in the buckled position by the action of the spring.

The catch plate is designed so that when the catches are in the lowermost position the lower catch is projected into one or other of the links of the underside of the adjoining chain and such that when the catch plate is in the uppermost position the upper catch is engaged within one or another of the links of the adjoining upper side of the chain.

By controlling the instant at which the catches are struck I can cause the sliding blocks to travel out the runways when the lower catches are engaged with the chains and back on the runway when the top catches are engaged with the top sides of the chains.

To actuate the catches I employ inner and outer trips 68 and 68' on the runways, the trips 68 being positioned adjoining the outer chain wheels and those 68' adjoining the inner chain wheels.

Referring to Fig. 5 of the drawings, it will be seen that as the chain turns the sliding block is carried toward the chain wheel 45 owing to the engagement of the lower catch with a link of the chain and that as the sliding block approaches the chain wheel 45 the lower catch is struck by the trip 68' and disengaged from the chain. As the lower trip disengages the top trip catches into the top part of the chain into one of the top links with the result that the sliding block is caused to travel in the opposite direction with the chain. It will then continue traveling inwardly until it strikes the outer trip 68 where the action is reversed and the other trip engaged.

The action just described relative to the sliding block shown in the said Fig. 5 is taking place simultaneously in the other sliding block so that while I use what might be called a continuous chain drive the blocks are reciprocated outwardly and inwardly on the runways and carry with them the jaws or grippers hereinbefore referred to. The jaws appear in pairs at opposite sides of the runway and are connected by transversely extending combination gripping and stripping bars 69 and 69' permanently secured to the tips of the jaws and have the arms 39' and 40' thereof connected by transversely extending striker bars 39× and 40×. The tips of each pair of jaws are fitted with sets of prongs 70 extending from cross shafts 70' which have their ends terminating in cranks pivotally secured at 70× to the ends of the jaws and with the cranks fitted with short levers 70². To the levers I connect at each end a set of cross links 71 and 72, the link 71 being pivotally secured at 71' to the lower jaw, while the link 72 is pivotally secured at 72' to the top jaw. From this arrangement it will be obvious that as the jaws are closed together the links act to project the prongs beyond the combination stripping and gripping bars, the projected position being best shown in dotted outline in Fig. 1 of the drawings. The jaws at each side are connected by a coiled spring 73 which normally acts to draw the jaws together. The tip of each jaw carries a stop pin 74 which limits the swing of the levers 70² so that the links cannot pass over dead center. In the operation of the machine I desire the jaws to be swung around to what might be called the horizontal position and to be opened when they approach the sheaf receiver as they are utilized to withdraw the sheaves from the receiver and carry the same back in the form of a stook to the rear end of the runways at which point the stook is deposited. To accomplish the turning of the jaws to the horizontal position and the opening of the same I locate upper and lower pairs of spring pressed catches 75 and 76, these catches being secured to the runways and each presenting an inclined flange 77 which has the inner or forward end thereof cut off at an angle as indicated at 77' (see Fig. 7). The catches are fastened to the runways by a number of pins 78 operating in slots 78' which allow the catches to have an in and out movement in respect to the angle bars carrying them and they are normally held in the inner position by the action of a spring 79 passed around one of the pins and with its extremities bearing against the outer face of the catch.

By stating that the flanges incline I mean that they are not parallel to the angle bars of the runways but converge toward them, being farthest away from the runways at their outer ends and nearest the same at their inner ends.

The exact position which these pairs of catches have on the runways is determined entirely by the timing of the catching of the sheaves by the jaws as I wish the jaws, when coming in, to be first swung to their horizontal position by the top catches, then opened by the pairs of catches and retained open in position above and below the sheaves until the attendant is prepared to withdraw the sheaves in the form of a shock from the sheaf receiver.

In considering the action of the jaws in respect to the catches 75 and 76 I might here state that the jaws are offset at 39ª and 40ª so that the jaw arms at the opposite sides of the runway are farther apart than the gripping ends of the jaws with the result that when the jaws or grippers are coming in on the runways and in the vertical position as shown in Fig. 2 of the drawings the then leading jaw arms will engage with the rear ends of the flanges 77 of the top pair of catches which will have the effect of swinging the jaws over to bring them to the horizontal position and in this swinging over action the gripping ends of the jaws will swing clear of the flanges of the lower catches.

However, after the jaws have reached approximately their horizontal position the then trailing gripping arms will be both caught by the flanges of the pairs of catches which will, owing to the inclination of the flanges, cause the jaws to be opened as the blocks continue moving inwardly. The release of the jaws occurs the instant the controlling ends of the jaw arms are free to escape from the inner ends of the flanges 77. This release however in the present machine does not occur until the proper number of sheaves has been put into the sheaf receiver and then the machine is momentarily automatically put into action to clear the trailing ends of the jaw arms, allow the jaws to close on the assembled sheaves and withdraw the jaws with the assembled sheaves a predetermined distance on the runways after which time they are stopped. The position they occupy when so stopped is shown in dotted outline in Fig. 1.

The device for automatically controlling this momentary action, so to speak, of the jaws is now described.

The butting plate 24 is fitted at the lower inner corner with a vertically disposed pivoted lever 80 to the lower end of which I secure a rod 80' which passes across the front end of the shocker frame and is connected to the extending end of a crank 81' carried by a lengthwise extending rod 81 suitably carried by the inner bar 7 of the shocker frame. This latter rod is provided at the rearmost end with a crank 82 to which I connect a shifting rod 83 fitted with a spanner 84 which passes to the shifting member of the clutch 51. A spiral spring 85 is connected to the lower end of the lever 80 and extends to a bracket 85' secured to the upright 23'. This spring holds the lever normally in such a position that the clutch members are disengaged.
At the front of the shocker frame I locate a cross rod 86 which is fitted with an upstanding crank 86' connected by means of a short link 87 to a bell crank 88 suitably supported from the beam 5 and having the rear end thereof pivotally attached at 88' to the cross rod 80'. The rod 86 is continued over to the binder, there being a universal joint 86ª to accommodate the swinging of the machine and at the binder the said rod is fitted with a suitably positioned foot pedal 89 within convenient range of the attendant.

Considering the sheaves successively passed from the deck into the sheaf receiver it will be seen that they will push one another into the receiver until such a time that the receiver is filled and at this time the innermost sheaf, or the one at the inner end of the passage 33², will be engaging with the lever 80 and gradually forcing it in toward the binder until it is forced far enough to effect the engagement of the clutch. The instant the clutch engages the jaws pass forward for a short interval to allow the trailing ends of the arms thereof to escape the catches and the instant this occurs the jaws grip the exposed heads of the sheaves and start back with the sheaves and continue traveling back until the sheaves are pulled clear of the receiver. The instant they are clear of the receiver the jaws with the stook naturally swing down to the vertical position and coincident with the escape of the sheaves from the receiver the lever 80 is liberated and the spring 86 acts to pull back the lever and disengage the clutch. This action occurs very quickly and during the action the catch plates 61 have also been actuated and at the end of the action the jaws are in a position approximately as indicated in dotted outline in Fig. 1 of the drawings.

Here they remain inert suspending the stook until the attendant is prepared to drop it. When ready he presses the foot lever which operates through the rod 86 and associated parts to again throw in the clutch and the clutch remains in as long as his foot is on the pedal with the result that the jaws are carried back to the rear end of the runways and forwardly again to stopping position which occurs when he releases the foot pedal. In the back or outgoing movement of the jaws the jaw arms strike the flanges 77 of the catches but the catches spring out to accommodate and allow them to pass and then return to their original set position.

As the jaws approach the outer position on the runways they are opened and this is accomplished in the present instance by a jamming action on the striker bars 39ˣ and 40ˣ which is accomplished by the following parts.

To the inner plates of the sliding blocks I secure permanently a pair of upstanding fingers A and B which go with the blocks and occupy a position to the one side of the striker bar 40ˣ as the jaws approach the outer position (see Fig. 2) and prevent the arms 39' of the jaws from rotating in the direction indicated by the applied arrow (Fig. 2). The other striker bar 40ˣ of the jaws is designed to engage with a stop bar C secured permanently to the cross bar 43.
Obviously as the jaws are passed to the position shown in Fig. 2 the then leading striker bar will hit the stop bar C and as the outward movement continues the jaw arms will be drawn together and the jaws opened to deposit the stook.

During this releasing of the jaws the prongs are also automatically and quickly withdrawn from the sheaves and the bars 69 and 69' strip the sheaves from the prongs.
During the interval that the jaws are passing backwardly on the runways and at a time when they are approaching the rear end thereof I desire that the rear end of the carrier be swung downwardly toward the ground to firmly implant or impinge the base of the stook on the ground and also desire to quickly release the carrier after the stook has been implanted to swing up clear of the stook and have this movement occur the instant the jaws are released. For this purpose I provide what I have termed stook setters 90 which comprise the parts now described.

To each of the rear standards 55 I secure pivotally and adjustably rearwardly extending swinging arms 91, the rearmost ends of which are suspended from the carrier by comparatively light coiled springs 92. The joint formed between the standards and the arms is one which allows of the forward and rear adjustment of the arms and of the swinging of the arms in respect to the standards and it comprises, in the present instance, a bolt 93 passed through the standard and through a slot 91' in the arm and provided with a pair of lock nuts 94 and 94' which are adapted to jam against the opposing faces of the arm after the same has been adjusted to the desired position.

The rear end of each arm carries an upstanding trip bar 95 which is adjustable in respect to the arm, this being accomplished by a tie bar 96 extending between the trip bar and the arm and adjustably secured by a jam screw 97 to the trip.

In connection with the above disclosed stook setters I wish it to be distinctly understood that while I have shown a particular construction rendering them adjustable in respect to the standards, still I do not wish to be limited to the precise construction shown as this could be readily modified without in the slightest departing from the spirit of the invention.

The adjustment given is not automatic but this could be rendered so by connecting the forward ends of the arms to the stub shafts 30 and 30* so that upon the stub shafts being bodily shifted in the adjustment of the side bars 28 and 28' the inner ends of the arms 91 will move with the stub shafts.

Co-acting with the trip bars I provide shoes 98, there being a shoe extending laterally and outwardly from each of the sliding blocks. As will be observed in Fig. 3 the inner ends of these shoes are tapered at 98' in order that in the inward movement of the sliding blocks the trip arms will be pressed out and cleared past the shoes.

In order that the machine may be better understood I will now describe the manner in which it operates, assuming that the parts are in the position as shown in Fig. 1 of the drawings.

As the sheaves are ejected from the binder deck they pass into the receiver between the flared ends thereof and as the receiver is formed from a spring plate they are caught and held by the receiver, the natural tendency of the plate being to open slightly so that the received sheaf is under slight pressure. Each successive sheaf presses the preceding sheaf farther into the passage 33² until finally the passage is filled and the then leading sheaf engages and actuates the lever 80. The instant the lever is in this way automatically swung the clutch is engaged and the jaws pass inwardly toward the receiver sufficiently far to clear the jaw arms from the catches at which time the jaws grab the sheaves and the prongs are projected into the same. The instant the sheaves are cleared from the receiver the sheaves in the form of a stook fall down and swing the jaws to what might be termed their vertical position and with the butt of the shock entirely clear of the ground.

Coincident with the releasing of the sheaves from the receiver the lever 80 is actuated by its spring to disengage the clutch and the jaws are then stopped and remain inert and suspending the stook until the driver wishes to deposit the stook.

During the above action it will be understood that the catch mechanisms have been actuated to reverse the direction of movement of the sliding blocks.

When the attendant desires to deposit the stook carried by the jaws he presses the foot lever to engage the clutch and immediately the jaws start traveling out on the carrier. In going out the catch plates are pressed back to allow of the passage of the jaws and as the jaws approach the trip bars of the stook setters the shoes engage the upper ends of the trip bars and force them down, the stook setters swinging on the bolts 93. This swinging down action produced in the stook setters as they engage primarily with the forward ends of the shoes and then later riding along the under face of the shoes causes the quick down pulling of the outer end of the runways, this through the springs 92 and the weight of the stook, and the instant that the upper ends of the trip bars clear off the inner ends of the shoes the carrier is quickly raised to the normal position by the springs 52 and 53. Obviously this down action of the outer end of the carrier forces the stook to the ground, while still controlling it, and firmly sets or impinges the base of the stook on the ground so that it is properly set. In fact the action is practically identical to the hand action employed when one, by hand, places a stook on the ground.

Just prior to the time that the upper ends of the trip bars clear the inner ends of the shoes the jaw arms are pressed together quickly by the action of the stop bar 89 and the fingers 87 and 88 and consequently the jaws are released and the prongs are withdrawn so that the stook is freed from the machine at the instant the trip bars are cleared from the shoes.

During this entire back carrying and releasing movement of the stook the attendant has his foot on the pedal and after the stook has been implanted he can, when desired, release the foot pedal to throw the clutch out of engagment at which time the jaws will stop traveling.

This can occur at any time after the trip bars have cleared from the shoes.

The above completes the action of depositing the stook. This action is continued as long as the machine is in use.

If at any time the attendant wishes to adjust the stooker to accommodate varying lengths of sheaves he does it by manipulating the adjusting shaft 25 to cause the pinions mounted thereon to shift the racks and consequently the adjusting bars. As the adjusting bars move they carry the sheaf receiver to position it properly in respect to the sheaves being passed from the binder. When any adjustment such as this is made it is desirable also to adjust the stook setters so that they will operate sooner or later to throw down the outer ends of the runways.

In this connection it will be observed that if the distance between the tips of the striker bars and the pivot bolts 93 be shortened the outer ends of the runways will be forced farther down toward the ground by the shoes, while if they be lengthened they will not go down so far. This arrangement allows the carrier to accommodate the varying lengths of sheaves consistent with the adjustment given the receiver.

What I claim as my invention is:

1. In a shocking machine, the combination with a shocker frame, of upstanding corner posts located at the front end of the frame, a pair of opposing pivoted sway bars secured to the rear portion of the frame, a pair of lengthwise extending opposing elevated side bars having their rear ends pivotally connected to the sway bars and their forward ends lengthwise slotted and fitted with racks, a rotatably mounted adjusting shaft carried by the corner posts and passing through the slots of the side bars, pinions secured to the shafts and operatively mounted on the racks and a sheaf receiver carried by the side bars.

2. In a shocking machine in combination, a shocker frame, an elevated sheaf receiver carried forwardly of the frame and adapted to receive sheaves in the horizontal position and form them into a horizontally lying stook and means for forcibly withdrawing the assembled sheaves from the receiver in stook form and upending them into stook depositing position.

3. In a shocking machine in combination, a shocker frame, an elevated sheaf receiver carried forwardly of the frame and adapted to receive sheaves in the horizontal position and form them into a horizontally lying stook and with the head of the stook exposed and means for grabbing the exposed head of the formed stook, withdrawing it from the receiver, upending it after withdrawal and for carrying it back in respect to the frame and elevated from the ground prior to depositing.

4. In a shocking machine in combination, a shocker frame, an elevated sheaf receiver carried forwardly of the frame and adapted to receive sheaves in the horizontal position and form them into a horizontally lying stook and with the head of the stook exposed, means for grabbing the exposed head of the formed stook, withdrawing it from the receiver, upending it after withdrawal and for carrying it back in respect to the frame and elevated from the ground prior to depositing and means for depositing the stook on the ground and subsequently releasing the same.

5. In a shocking machine in combination, a shocker frame, an elevated sheaf receiver carried forwardly of the frame and adapted to receive sheaves in the horizontal position and form them into a horizontally lying stook and with the head of the stook exposed, a rearwardly extending carrier mounted on the shocker frame and to the rear of the receiver, pivoted grabbers carried by the carrier and mounted for forward and rear reciprocation on the same, means for controlling the grabbers to catch the head of the stook in the receiver when advancing to the forward end of the carrier, means for withdrawing the grabbers outwardly of the carrier to withdraw the stook from the receiver and carry it backwardly of the carrier in an upended elevated position, means for throwing down the rear end of the carrier as the grabbers approach the rear end of the carrier to effect the depositing of the stook on the ground and means for releasing the grabbers from the stook subsequently to depositing the same on the ground.

6. In a shocking machine in combination, a shocker frame, an elevated sheaf receiver carried forwardly of the frame and adapted to receive sheaves in the horizontal position and form them into a horizontally lying stook and with the head of the stook exposed, a rearwardly extending elevated carrier mounted on the stooker frame to the rear of the receiver, a pair of pivoted jaws mounted on the carrier for backward and forward reciprocating movement in respect to the carrier, means for moving the jaws on the carriers at predetermined instants, means for controlling the jaws when at the inner end of the carrier to effect the opening of the same to admit between them the exposed head of the stook and subsequently to release them to grab the stook from the receiver, means for dropping the outer end of the carrier toward the ground as the jaws approach said outer end, said means effecting the implanting of the stook on the ground and means for releasing the jaws to free the stook and for coincidently raising the rear end of the carrier to clear the jaws from the stook.

7. In a shocking machine in combination, a shocker frame, an elevated sheaf receiver carried forwardly of the frame and adapted to receive sheaves in the horizontal position and form them into a horizontally lying stook and with the head of the stook exposed, a rearwardly extending elevated carrier having the forward end pivotally mounted from the stooker frame, means flexibly supporting the rear end of the carrier, a pair of pivoted jaws mounted on the carrier for backward and forward reciprocating movement in respect to the carrier, means for moving the jaws on the carrier at predetermined instants, means for controlling the jaws at the inner end of the carrier to effect the opening of the same to admit between them the exposed head of the stook and subsequently to release them to grab the stook and withdraw the same from the receiver, means for automatically forcing down the outer end of the carrier toward the ground as the jaws approach said outer end, said means impinging the base of the stook on the ground while held by the jaws and means for releasing the jaws to free the stook and to raise clear of the same under the action of the flexible support of the carrier.

8. In a shocking machine in combination, a shocker frame, an elevated sheaf receiver carried forwardly of the frame and adapted to receive sheaves in the horizontal position and form them into a horizontally lying stook and with the head of the stook exposed, a rearwardly extending elevated carrier mounted on the stooker frame and to the rear end of the receiver and having the forward end thereof pivotally suspended, a pair of sliding blocks operatively mounted in the carrier, means for reciprocating the blocks rearwardly and forwardly within the carrier and for controlling the movement thereof at predetermined instants, a cross shaft carried by the blocks, a pair of pivoted gripping jaws carried by the cross shaft, means for turning the jaws to a horizontal position when coming forwardly on the carrier and for opening the jaws to receive the exposed head of the stook and for subsequently releasing them to grab the stook, means for automatically depressing the rear end of the carrier as the jaws approach the outer end to effect the setting of the stook firmly planted on the ground and means for automatically opening the jaws subsequent to the implanting of the stook.

9. In a shocking machine, the combination with a carrier presenting a pair of endless driven chains, of a pair of sliding blocks slidably mounted in the carrier, a pair of gripping jaws carried by the blocks and means for automatically connecting the blocks alternately with the upper and lower sides of the chain and as they approach the ends of the carrier to effect the reciprocation of the blocks in the carrier.

10. In a shocking machine, the combination with a pair of pivoted gripping jaws for carrying and depositing the stook and means for opening and closing the jaws at predetermined instants, of prongs located at the tips of the jaws and links connecting the prongs with the jaws and arranged to project the prongs into the stook in the closing of the jaws and to withdraw the prongs from the stook in the opening of the jaws.

Signed at Winnipeg, this 12 day of March, 1918.

PRESTON CHARLES WEST.

In the presence of—
  G. S. Roxburgh,
  K. B. Wakefield.